United States Patent [19]

Guerro et al.

[11] Patent Number: 4,810,296

[45] Date of Patent: Mar. 7, 1989

[54] HYDROXAMATED POLYMERS AS ADDITIVES FOR RETARDING THE RATE OF SET OF HYDRAULIC CEMENT COMPOSITIONS

[75] Inventors: Gerald J. Guerro, Trumbull; William A. Henderson, Jr., Stamford; Balwant Singh, Stamford, all of Conn.

[73] Assignee: American Cyanamid Company, Stamford, Conn.

[21] Appl. No.: 155,950

[22] Filed: Feb. 16, 1988

[51] Int. Cl.[4] .............................................. C04B 24/00
[52] U.S. Cl. ...................................... 106/90; 106/315
[58] Field of Search ...................... 106/90, 315; 524/4, 524/5

[56] References Cited

U.S. PATENT DOCUMENTS

| | | | |
|---|---|---|---|
| 4,480,067 | 10/1984 | Vio et al. | 210/698 |
| 4,532,046 | 7/1985 | Meunier et al. | 210/701 |
| 4,536,296 | 8/1985 | Vio | 525/377 |
| 4,681,634 | 7/1987 | Roca et al. | 106/314 |

*Primary Examiner*—William R. Dixon, Jr.
*Assistant Examiner*—Anthony J. Green
*Attorney, Agent, or Firm*—Gordon L. Hart

[57] ABSTRACT

The rate of set of an aqueous slurry of hydraulic cement can be retarded by means of an additive comprising a water-soluble polymer which contains hydroxamic acid pendant groups. Hydroxamated acrylamide polymers and copolymers are preferred additives for retarding set in cement slurries.

8 Claims, No Drawings

HYDROXAMATED POLYMERS AS ADDITIVES FOR RETARDING THE RATE OF SET OF HYDRAULIC CEMENT COMPOSITIONS

The invention relates to improvements in hydraulic cement compositions and to methods for making and using such compositions. More particularly, the invention employs water soluble polymers containing hydroxamic acid groups as additives for retarding the rate of set of hydraulic cement slurries.

Water soluble polymers having hydroxamic acid pendant groups are known and have been described for use in a number of practical applications. In drilling and well-completion muds, water soluble hydroxamated polymers have been added to improve thermal stability and reduce viscosity as described in U.S. Pat. No. 4,536,296. Such polymers are also described for use in impeding sedimentation of clays during use of river water, by U.S. Pat. No. 4,480,067. They are used for hindering scaling from water in water containers and conduits as described in U.S. Pat. No. 4,532,046.

Reference is made to the patents mentioned above for descriptions of the preparation of water soluble polymers of many types having hydroxamic acid pendant groups.

Soluble hydroxamated polymers can be readily prepared, for example, by reaction of hydroxylamine, or its salt, with the pendant amide groups on soluble polymers or copolymers, in aqueous solution or suspensions, e.g.

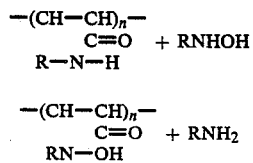

wherein R is H or a non-reactive hydrocarbon radical. Instead of the hydroxylamine, a salt of the hydroxylamine, e.g. RNHONa may be used in which case the hydroxamic acid salt is made.

We prefer to make water soluble polymers having hydroxamic acid pendant groups by reacting water soluble polyacrylamide homopolymers or copolymers with hydroxylamine. The polymers may be fully hydroxamated or they may be only partially hydroxamated by reacting all or only part of the amide groups on the polymer with hydroxylamine. Methods for preparation of fully and partially hydroxamated polyacrylamides and acrylamide copolymers are well known, as described, for example, in the patents mentioned above.

For use in the invention we prefer partially hydroxamated soluble polyacrylamides having molecular weights in the range from about 500 to about 5,000,000. Solubilizing the higher molecular weight polymers is sometimes difficult so we prefer use of polymers having molecular weights below 100,000 and most preferably those in the range from about 1,000 to about 20,000. The molecular weights of polymers, as referred to herein are measured by gel permeation chromatography (gpc). The degree of hydroxamation of useful hdroxamated acrylamide polymers may be in the range from about 10% to 100% of the amide pendant groups being hydroxamated and we prefer those polymers which have been hydroxamated about 20% to about 60%.

The invention can be used to retard the rate of setting of hydraulic portland cement mixtures of various sorts and kinds.

Effective amounts of the polymers having hydroxamic acid pendant groups as additives in hydraulic cement mixtures for effective retardation of the setting rate may range from about 0.01% to about 3 percent by wt. (100 to 30,000 ppm) based on weight of solids in an aqueous cement slurry and higher amounts may be used if desired.

Setting of hydraulic cements is accelerated as temperatures are increased above normal room temperature. The polymer additives of the invention are found to effectively retard the setting rate, even at elevated temperature as demonstrated in Examples 4 and 5 below.

Some especially preferred embodiments of the invention are described in more detail by the following examples.

Example 1

A cement slurry was thoroughly mixed, consisting
Portland Cement (Allentown Type 1)—10 g.
Clean Sand—30 g.
Tap Water—5.5 g A sample from this slurry was packed and tamped into a four-dram vial and allowed to set at room temperature. The vial was capped and opened periodically to test the degree of set of the sample. The degree of set was tested by inserting a thin, narrow spatula into the sample in the vial. Degrees of set were classified as follows:

N—Not set—resistance essentially the same as when first made up.
P—Partly set—resistance increased but spatula still inserted easily.
M—Mostly set—substantial resistance to insertion of spatula.
S—Set—Spatula cannot be inserted.

Times to reach those degrees of set were as follows:
P—230 min.
M—300 min.
S—480 min.

EXAMPLE 2

A cement slurry was prepared as in Example 1 except 500 ppm (0.05 percent by wt.) based on total solids, of hydroxamated polyacrylamide (HPAM), was thoroughly mixed into the slurry. Molecular weight of this HPAM was 10,000 and its degree of hydroxamation was 57%. This additive is designated PSC 1050. A sample of this slurry was prepared and tested as in Example 1. Times to reach the degrees of set were:
P—580 min.
M—not measured
S—not measured This demonstrates a substantial retardation of set by the use of 500 ppm of the hydroxamated polymer in the slurry. In the time for complete set of the control sample (Ex 1, 480 min) the treated sample had reached no more than partial set (P).

EXAMPLE 3

A slurry was prepared and tested as in Example 2 except only 150 ppm of the same PSC 1050 HPAM additive were used. Time to partly set, P, was 300 min and the sample remained only partly set at 450 min. At 560 min the sample was no more than mostly set (M). The set retardation using only 150 ppm of additive was not as much as when using 500 ppm, nevertheless the set was significantly retarded by only 150 ppm of additive in the slurry.

EXAMPLE 4

Control and test samples were made and tested as described in Examples 1 and 2 except the samples were kept at 36° C. instead of room temperature during the setting period. The control sample containing no HPAM reached set (S) at 180 min. The sample containing 500 ppm of the PSC 1050 HPAM showed no set (N) at 240 min. and reached the mostly set condition (M) at 300 min. The set retarding additive is quite effective at 36° C.

EXAMPLE 5

A test sample was made and tested as described in Example 4 except, instead of the PSC 1050 HPAM, another HPAM having approximate molecular weight of five million and having 30% hydroxamation, designated PSC-5M 30, was used in the same amount, 500 ppm. At 180 minutes the sample had reached the mostly set condition (M). The time at the no set condition (N) was far shorter when using the high molecular weight polymer additive PSC-5M 30, as compared with the PSC 1050, but the times to the mostly set condition (M) were practically the same.

In tests, using controls, like those described in the detailed examples above, low molecular weight polyacrylamides (MW=1500) which were respectively 20% hydroxamated and 30% hydroxamated, used at 500 ppm concentration caused marginal retardation of the rate of setting.

Other polymers having pendent hydroxamic acid groups useful as additive according to the invention can be made by partial or complete hydroxamation of pendant carboxyl or carboxylate moities in homopolymers or copolymers comprising polymerized acids such as acrylic acid, methacrylic acid, maleic acid or its anhydride, an ester or salt of those acids, and the like. The polymerized units having hydroxamic acid pendant groups can be in copolymers with other copolymerized units of acrylamides, methacrylamide, acrylic acid, methacrylic acid, vinyl ethers, olefins, maleic acid and the like. Also, with N-substituted acrylamides and methacrylamides, wherein the substituents may be alkyl, aryl, alkoxy, and the like. Also with styrene and substituted styrenes such as bromostyrene, methoxy styrene, methyletyrene, and the like.

Solubility of the polymer additives, which is important to the success of the invention, will depend to some extent on the molecular weight of a selected polymer additive. Usually polymers having molecular weight (gpc) in the range from about 1000 to about 20,000 will be found most effective, but hydroxamated polymers outside this range may also be found effective for retarding cement setting rate.

The preferred hydroxamic acid polymers and copolymers useful according to the invention are granular or powdered solids which may be conveniently added as the aqueous cement slurry is made up. The additive may be dissolved in water which is then added to make the cement slurry. Or the additive may be blended dry with portland cement before the cement slurry is made. Or the dry additive may be added directly and mixed into the slurry with cement and other solids. Addition by dissolving the polymer in water before the slurry is made is preferred, to most easily obtain good dispersion of additive in the slurry mix. The addition to a hydraulic cement slurry in any retarding amount, of a soluble polymer having pendant hydroxamic acid groups is within the contemplated scope of the invention.

We claim:

1. A method for retarding the setting rate of hydraulic cement slurry comprising addition to a cement slurry of a retarding amount of a water soluble hydroxyamated polyacrylamide homopolymer or copolymer.

2. A method defined by claim 1 wherein the hydroxamated polyacrylamide is of molecular weight below 100,000.

3. A method defined by claim 2 wherein the hydroxamated polyacrylamide is of molecular weight in the range from about 1,000 to about 20,000.

4. A method defined by claim 3 wherein the water soluble hydroxamated polyacrylamide is hydroxamated from about 10% to about 100%.

5. A method defined by claim 4 wherein the polymer is 20% to 60% hydroxamated.

6. A method defined by claim 3 wherein the hydroxamated polyacrylamide is 20% to 60% hydroxamated.

7. A hydraulic cement slurry comprising a water soluble hydroxamated polymer or copolymer of acrylamide having molecular weight below 1000 and being about 20% to 60% hydroxamated, said polymer being present in amount effective for retarding set of the cement slurry.

8. A slurry defined by claim 7 wherein the amount of said water soluble polymer in the slurry is in the range from 100 to 30,000 ppm based on weight of solids in the slurry.

* * * * *